United States Patent [19]

Curtis et al.

[11] Patent Number: 5,223,806
[45] Date of Patent: Jun. 29, 1993

[54] METHOD AND APPARATUS FOR REDUCING ELECTROMAGNETIC INTERFERENCE AND EMISSION ASSOCIATED WITH COMPUTER NETWORK INTERFACES

[75] Inventors: Robert A. Curtis, Hudson; Dusan S. Skendzic, Boston, both of Mass.

[73] Assignee: Digital Equipment Corporation, Maynard, Mass.

[21] Appl. No.: 748,947

[22] Filed: Aug. 23, 1991

[51] Int. Cl.$^5$ .............................................. H04B 3/28
[52] U.S. Cl. ..................................... 333/12; 333/180; 174/35 R
[58] Field of Search ................. 333/12, 4, 5, 177, 180; 174/35 R, 32, 34

[56] References Cited

U.S. PATENT DOCUMENTS

5,113,159  5/1992  Adriaenssens et al. ............. 333/12

Primary Examiner—Steven Mottola
Assistant Examiner—Ali Neyzari
Attorney, Agent, or Firm—Cesari and McKenna

[57] ABSTRACT

A computer network interface ("NIC") exhibits reduced electromagnetic interference and emission through capacitively coupling an output transformer center tap both to reference ground and to logic ground of the NIC's transceiver. Transmit signal lines on both sides of the transceiver are also capacitively coupled to both grounds. Other aspects of the invention reduce electromagnetic interference and emission through improvements in the construction of the NIC printed circuit board and the technique for intercoupling a plurality of NIC's using shielded twisted-pair cable.

15 Claims, 5 Drawing Sheets

METHOD AND APPARATUS FOR REDUCING ELECTROMAGNETIC INTERFERENCE AND EMISSION ASSOCIATED WITH COMPUTER NETWORK INTERFACES

FIELD OF THE INVENTION

The invention pertains to computers, and more particularly to techniques for reducing electromagnetic interference ("EMI") within network interface cards, and radio-frequency emissions associated therewith, during intercomputer communication.

BACKGROUND OF THE INVENTION

Network interface cards installed within computers, e.g., personal computers, enable them to communicate within a computer network, such as ETHERNET. Typically, the network interface cards (or "NIC's", as they are sometimes called) have serial interfaces for translating signals between codes used for communication within the computer and those used for inter-computer communication. The NIC's also contain transceivers to send and receive communication signals over the network. The signals from the transceivers typically are filtered to reduce noise prior to delivery to the network. A conventional filtering circuit found in NIC's has an output transformer for suppressing common-mode noise. The serial interfaces, transceivers and filter circuits are typically mounted on a NIC printed circuit ("pc") board.

A particular type of network interface card, called an ETHERNET adapter, is used in Europe to connect personal computers to an ETHERNET network via shielded twisted-pair cable. In such cable, two pairs of signal lines, one for transmission and one for reception, are surrounded by a conductive shield.

While known network communication interfaces, including the just described Ethernet adapter, generally perform satisfactorily, stringent standards have been promulgated in various countries to reduce electromagnetic emissions from such communication devices. For instance, in the Federal Republic of Germany, Deutcher Bundes Post Directive 1046/1984 and Limit Class B of DIN Verband Deutcher Elektrotechniker ("VDE") pertain to personal computers equipped with network interface cards. Computer manufacturers have had difficulty heretofore in meeting such standards, and in particular the just-mentioned German standards, using conventional techniques for reducing emissions.

SUMMARY OF THE INVENTION

The invention resides in an improved network interface card that exhibits reduced electromagnetic interference and thus causes a reduced level of radio-frequency emission. The NIC employs an output transformer having an output winding with a center tap that is connected through a first capacitor coupled to the logic ground of the transceiver, i.e., a logic ground pin of the transceiver, and, through the first capacitor and a second capacitor to reference ground, i.e., a point on the NIC that is connected to "earth" ground.

Among other advantages, this connection to the transceiver logic ground localizes transients of high-frequency (e.g., frequencies over about 30,000,000 Hz) near the transceiver where such transients often arise, and isolates the transients from the reference ground. In addition, this arrangement removes common-mode noise from the signals to be transmitted. Moreover, since the shield of the twisted-pair cable is preferably coupled to the reference ground, this arrangement isolates the transients from the shield. By controlling the transients in this way, the invention reduces unwanted emissions resulting from the transients that would otherwise emanate from the downstream signal path in the NIC and, particularly, from the shield.

Additionally, common-mode bypass capacitors associated with the input and output signal paths of the transceiver suppress common-mode high-frequency noise, e.g., in the signals to be transmitted, and thus further reduce emissions.

In another aspect of the invention, the NIC has a pc board for mounting its electrical components that is etched specifically to provide lower EMI. The board is of multi-layer design with voids directly beneath the output transformer in the power and ground plane layers. (The power plane furnishes a conductive path from a power supply to circuitry on the NIC.) The voids in the power and ground planes prevent unwanted cross-coupling of the signals to be transmitted with the signals in those planes of the board; such cross-coupling could give rise to fluctuations in the power supply voltage and ground potential, thereby leading to radio emissions.

In yet another aspect of the invention, each NIC has a bulkhead or mounting plate on the pc board, which is directly coupled to the shield of the twisted-pair cable. Conventionally, the bulkhead is connected to earth ground and furnishes the reference ground to the ground plane of the pc board. Also, conventionally, the twisted pair cable is coupled at each of its ends to an associated NIC, but the shield at only one cable end is coupled directly to the bulkhead of the associated NIC. The other end of the cable shield has been insulated from the bulkhead. Contrary to this conventional coupling technique, the shield at both cable ends is coupled to the bulkheads of the associated NIC's in accordance with the invention to reduce electromagnetic emissions from the shield.

The invention resides also in a method of reducing emissions from NIC's by grounding the output transformer, using common-mode bypass capacitors, and in constructing and interconnecting the NIC's, all as heretofore described.

The various aspects of the invention can be practiced together, or separately, depending on the degree of electromagnetic interference reduction and emission-suppression sought for a particular application.

BRIEF DESCRIPTION OF THE DRAWINGS

The above and further advantages of this invention may be better understood by referring to the following description taken in conjunction with the accompanying drawings, in which.

DETAILED DESCRIPTION OF AN ILLUSTRATIVE EMBODIMENT

Figure 1:
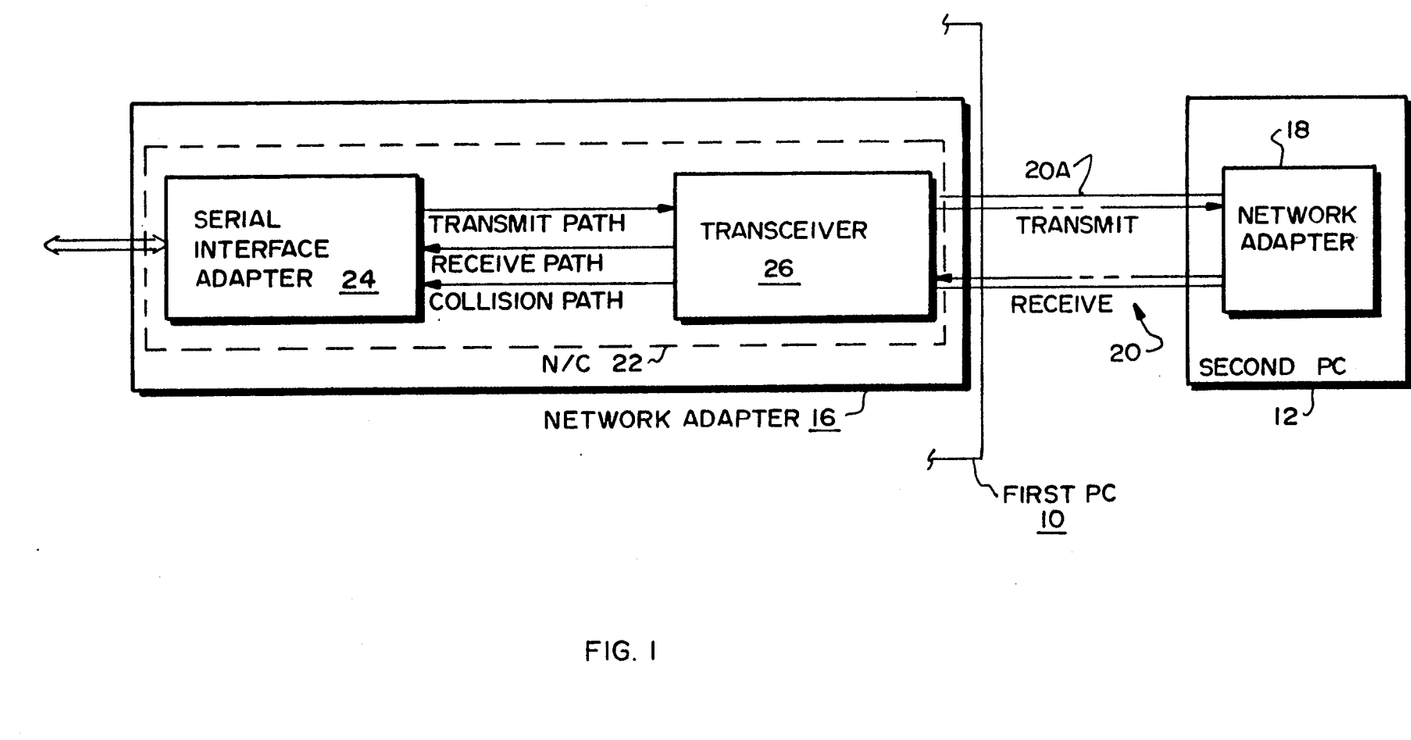
FIG. 1 is a block diagram of personal computers having computer network interfaces interconnected for communication by shielded twisted-pair cable in accordance with an illustrative embodiment of the invention.

FIG. 1 shows first and second computers 10, 12, preferably personal computers, having respective computer network adapters 16, 18 coupled for communication over a communication link 20. The communication link 20 is preferably a shielded twisted-pair cable, having two pairs of signal lines (i.e., TRANSMIT and RECEIVE lines) surrounded by a shield 20A. The signal lines are further described below.

The network adapters 16, 18 are preferably identical in construction and operation, and therefore an explanation of adapter 16 will sufficiently describe both. Network adapter 16 has a network interface card ("NIC") 22 in the form of a printed circuit ("pc") board. The NIC 22 permits the computer 10 to communicate with other computers, including computer 12, in a local area network, such as Ethernet (trademark). Applicable standards specify the communication signal characteristics, including encoding, and parameters for intercomputer communication over the Ethernet network.

The NIC 22 physically mounts and electrically interconnects various circuit elements, including a serial interface adapter 24 and a transceiver 26 for transmitting signals to, and receiving signals from, the personal computer 12.

The serial interface adapter 24 converts, e.g., non-return-to-zero ("NRZ") encoded signals used for communication within the personal computer 10 into encoded signals (e.g., Manchester encoded signals) suitable for transmission over the cable 20. The adapter 24 also converts Manchester encoded signals received by the personal computer 10 over the cable 20 into NRZ and clock signals for use within the computer 10.

Figure 2:
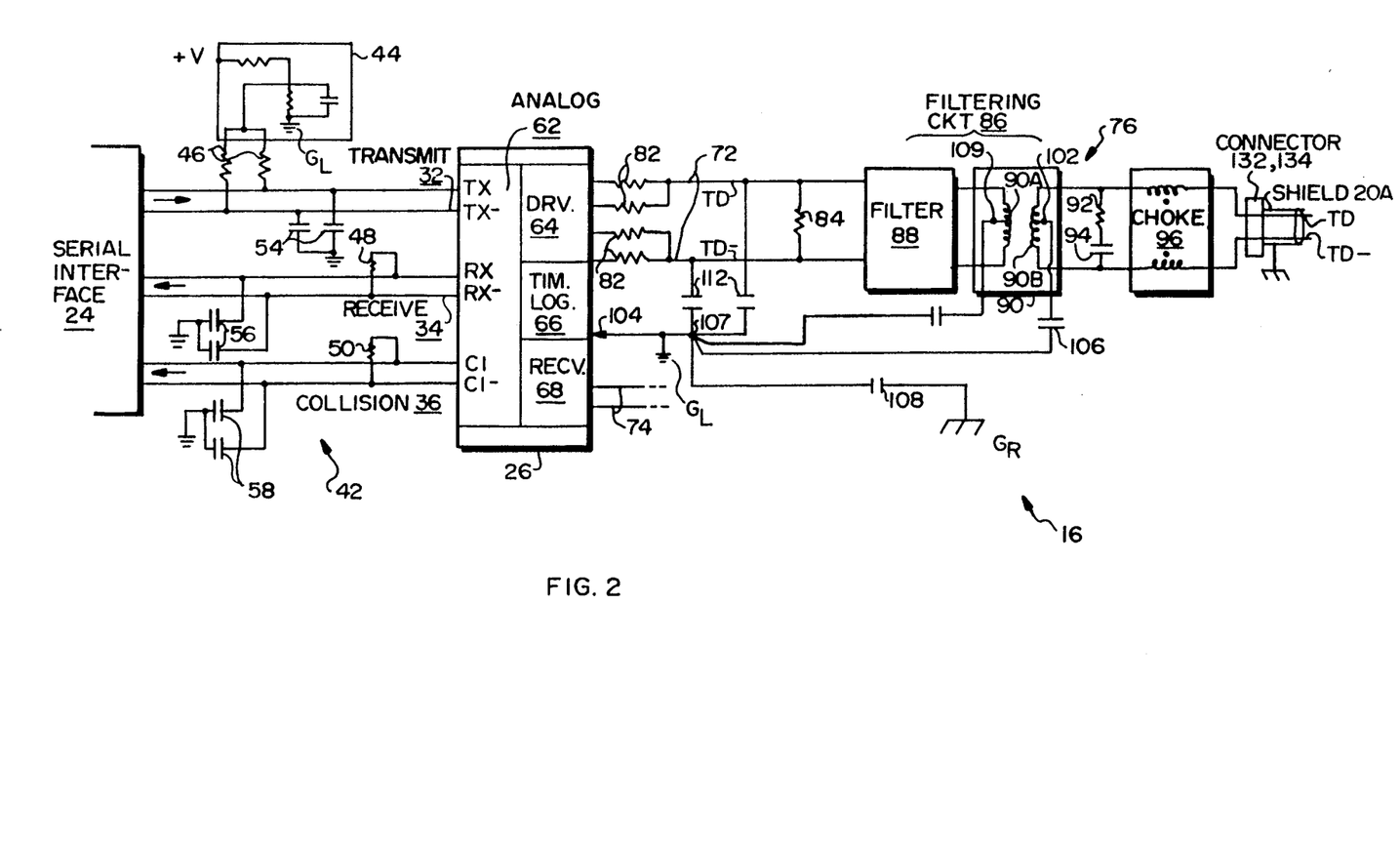
FIG. 2 is a schematic, partially in block diagram form, of a transceiver circuit of one of the computer network interfaces of FIG. 1.

FIG. 2 shows the circuitry of the NIC in greater detail. The serial interface 24 is coupled to the transceiver 26 by a plurality of signal paths, including a transmit path 32, receive path 34, and collision path 36. Circuit elements connected to these paths 32-36 form what can be called a transmit-input and receive-output ("TI/RO") circuit 42 for the transceiver 26.

Each signal path 32-36 includes a pair of differential signal lines, i.e., TX and TX−, RX and RX−, CI and CI−, respectively, as prescribed in applicable Ethernet standards. TX and TX− of the transmit path 32 carry signals from the serial interface 24 to the transceiver 26 for transmission to the computer 12. RX and RX− of the receive path 34 carry signals received by the transceiver 26 from the computer 12 to the serial interface 24. RX and RX− also return signals carried by the transmit path 32 to the transceiver to verify transmission from transceiver 26 of those signals. CI and CI− of the collision path 36 carry signals indicating whether a collision has occurred, i.e., whether the transceiver 26 received a signal from the computer 12 at the same time it was transmitting a signal thereto. If a collision occurs, transmission from transceiver 26 normally is ended.

The TI/RO circuit 42 has a biasing circuit 44 for applying a bias voltage to the transmit path lines TX, TX−. Specifically, the biasing circuit 44 couples a +v voltage source to the lines TX, TX− via respective load resistors 46. Circuit 42 also has a load resistor 48 across the RX and RX− lines, and a load resistor 50 across the CI and CI− lines. Additionally, common-mode capacitors 54, 56, 58 are connected between the TX and TX−, RX and RX−, CI and CI− lines of the transmit, receive and collision signal paths and the logic ground of the transceiver 26 (denoted in the drawing by the symbol at $G_L$), and, via the logic ground, to the reference ground (denoted in the drawing by the symbol at $G_R$), to suppress common-mode noise in the signals carried by the respective lines. The advantages of grounding these lines in this way will be described in greater detail below.

The transceiver 26 has an analog circuit 62, driver circuit 64, timing logic 66, and receiver circuit 68. A suitable transceiver 26 is available as an integrated circuit, for example, from American Telephone and Telegraph ("AT&T"), Allentown, Pa., USA as Transceiver T7220. The path lines just described in the preceding paragraphs are connected to the analog circuit 62. The driver circuit 64 applies, to a transmit signal path 72, signals to be transmitted from the personal computer, while the receiver circuit 68 receives, over a receive signal path 74, signals sent by the personal computer 12. The timing logic 66 is responsible for providing timing and synchronizing signals to the other circuit components.

The transmit signal path 72 has signal lines TD and TD−. Circuit elements connected to the transmit signal path 72 form what can be called a transmit-signal-path circuit 76.

The transmit-signal-path circuit 76 has a pair of drive resistors 82 for precharging each signal path TD and TD−, connected at one end to the driver circuit 64. A shunt resistor 84 for controlling peak-to-peak voltages is coupled between the signal lines TD and TD− at the output ends of the drive resistors 82.

The output from the drive resistors 82 is fed to a filtering circuit 86 that includes a filter 88, such as PE-65421, which is available from Pulse Engineering Co., San Diego, Calif., USA. The filtering circuit 86 includes a low-pass filter 88, and an output transformer 90. The output transformer has an input winding 90A and an output winding 90B. For impedance compensation, a resistor 92 and capacitor 94 are serially connected across the signal lines TD and TD− at the output of the output winding 90B of the transformer 90. From the output of the output transformer 90, the signal lines TD and TD− pass through a choke 96 for reducing common-mode and differential noise, and then are coupled by a suitable connector 132, 134 to the shielded twisted-pair cable 20.

In accordance with the invention, a center tap 102 of the output winding 90B of the output transformer 90 is capacitively tied to logic ground 104 (i.e., the logic ground pin) of the transceiver 26 and capacitively tied to the reference ground. More specifically, the center tap 102 is coupled through a capacitor 106 to a node 107, and node 107 is coupled both directly to the transceiver logic ground 104, and, through a capacitor 108, to reference ground.

The size of the capacitor 106 should be selected to be greater than the capacitance across the transformer 90, so as to minimize the common-mode voltage output from the transformer, e.g., about 1000 pF. The size of the capacitor 108 can be empirically determined, and is, e.g., about 0.01 microFarad.

A center tap 109 on the input winding 90A is also capacitively tied via node 107 to both logic ground 104 and reference ground, in the same manner as described for center tap 102. This reduces the common-mode noise from the signal to be transmitted from the NIC 22, and also indirectly reduces electromagnetic emissions from the transformer 90.

More specifically, by coupling the output center tap 102 to the logic ground 104, unwanted currents are localized, i.e., a current path is established for high-frequency signals back to the transceiver 26. Consequently, these signals are substantially neither transmitted over the cable 20 nor applied to the reference ground. Any such signals applied to the reference ground cause a voltage transient, which could give rise to what has been called "ground bounce," leading, in the extreme, to radio emissions from the cable shield 20A connected to the reference ground. By reducing these transients, the invention reduces the emissions associated with the NIC 22.

In addition, first and second common-mode bypass capacitors 112 are coupled between respective signal lines TD and TD− (between the drive resistors 82 and the filter 88) and the node 107. The common-mode bypass capacitors 112 serve to reduce high-frequency signal components on the signal lines TD and TD−, and electromagnetic coupling therebetween. The values of resistors 82, 84 and the capacitors 112 are chosen to substantially reduce signals greater than, e.g., about 30 MHz, attenuate signals at mid-frequencies, e.g., about 10 MHz, and not affect signals at frequencies below about 10 MHz. The concern here is to reduce the unwanted high-frequency signals, e.g., switching noise, emitted by from the transceiver 26.

The common-mode bypass capacitors 54–58 are advantageous for some of the same preceding paragraph with respect to capacitors 112. The sizes of all of the capacitors 54–58 and 112 can be empirically determined. Overall, it can be seen that both transmit paths 32 and 72 on the respective input and output sides of the transceiver 26 have common-mode bypass capacitors 54 and 112 for improved common-mode rejection.

Figures 3, 5:
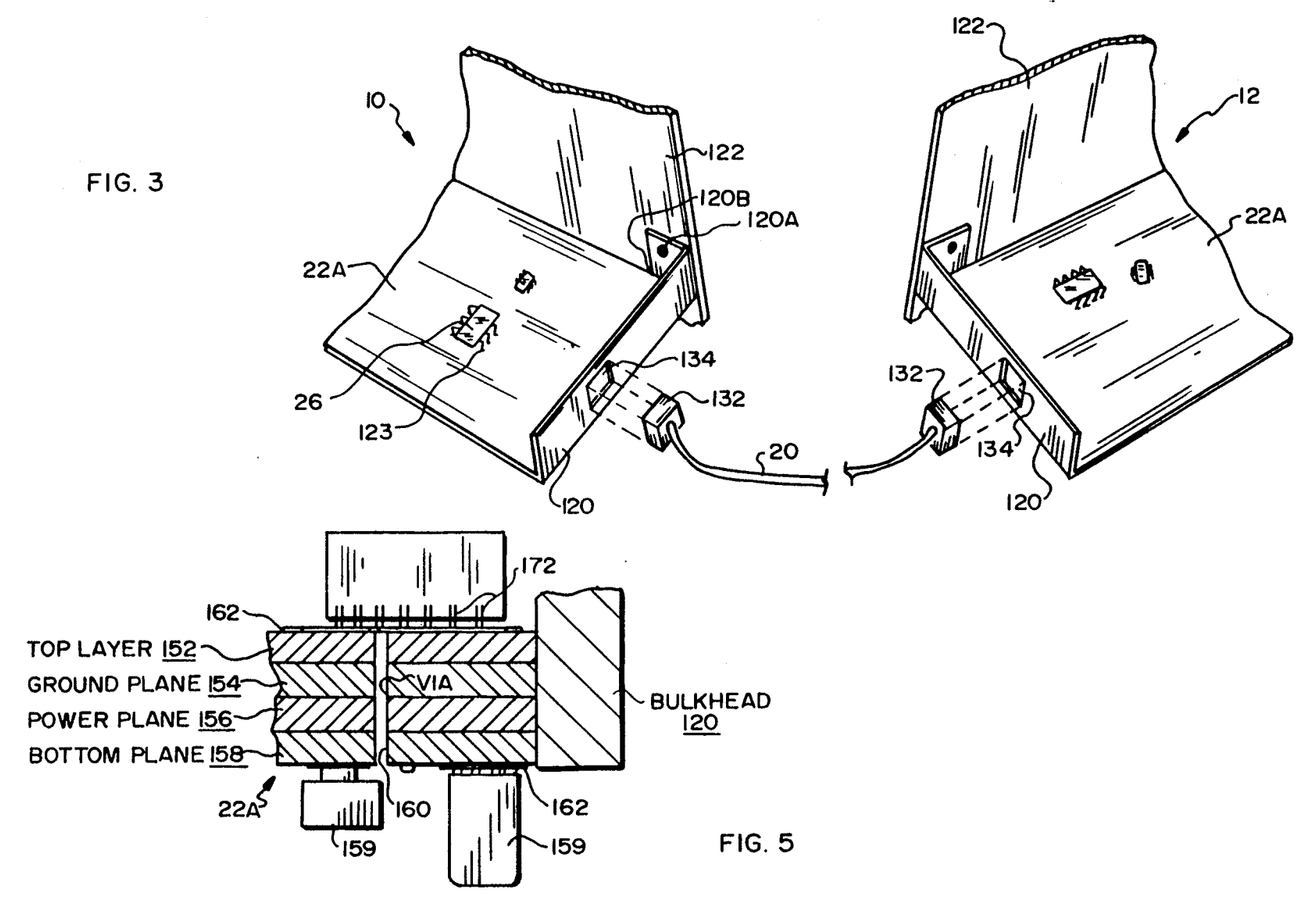
FIG. 3 is a representation of the computer network interfaces and shielded twisted-pair cable of FIG. 1.
FIG. 5 is an enlarged, partial side view, partially in section, of each computer network interface of FIG. 3.

FIG. 3 will be described next to provide a better explanation of the foregoing aspects of the invention, and to introduce various other measures that can be taken optionally with respect to the design and construction of the NIC 22 to further reduce emissions.

FIG. 3 shows first and second NIC's 22 of the respective personal computers 10, 12 interconnected for inter-computer communication by the shielded twisted-pair cable 20. Each NIC 22 has a bulkhead 120, i.e., a mounting plate, connected at the end of the NIC pc board 22A. The bulkhead 120 is connected, in turn, to a computer housing 122 in a conventional manner at, e.g., location 120A, and to the ground plane 156 (not shown in this view) of the pc board 22A at, e.g., location 120B.

Since, as is conventionally the case, the computer housing 122 is connected to earth ground, the bulkhead connection to the ground plane furnishes the reference ground for the NIC at the location 120B. It should be noted that, since the connection between the transceiver logic ground and the ground plane is preferably immediately below the transceiver 26, e.g., at location 123, that ground connection is located at a significant distance from the reference ground connection at location 120B. Because of this distance, and the inherent, albeit, low, resistance in the ground plane, transients in the ground plane can give rise to a fluctuating voltage gradient between the transceiver logic ground and the reference ground, that gives rise, in turn, to radio emission. The measures described above can reduce such EMI and suppress the resulting emission.

Other techniques can be employed to further reduce emission. As mentioned above, the cable 20 terminates in a male connector or plug 134, which can be matingly received within a female connector 132 mounted in the bulkhead 120. Commonly available connectors, such as, for example, RJ-45's, can be used.

In accordance with a further aspect of the invention, the shield 20A of the cable 20 is directly coupled with the bulkhead 120, and thus to the NIC reference ground at each personal computer 10, 12 so as to suppress transient voltages on the shield that can produce emissions. The electrical contact between the shield 20A and the bulkheads 120 can be effected using the above-mentioned RJ-45 connectors.

Conventionally, two types of RJ-45 connectors are used for coupling cables for inter-computer communication, both of which provide electrical contacts for connecting the shield to the female connector. A first type of RJ-45 connector has an insulating housing surrounding the female connector so as to provide an open circuit between the shield and bulkhead of the NIC. The other type lacks such an insulating housing and provides for a direct electrical connection between the shield and bulkhead. Commonly, the shield is grounded to the bulkhead using the latter type of connector on only one end. The first type of RJ-45 connector with the insulating housing is used at the other end of the cable.

As noted above, the invention contemplates grounding the shield at both ends, and thus uses only the female RJ-45 connector that lacks the insulating housing. Suitable connectors for use in the invention are shown in FIGS. 4A and 4B.

Figure 4A:
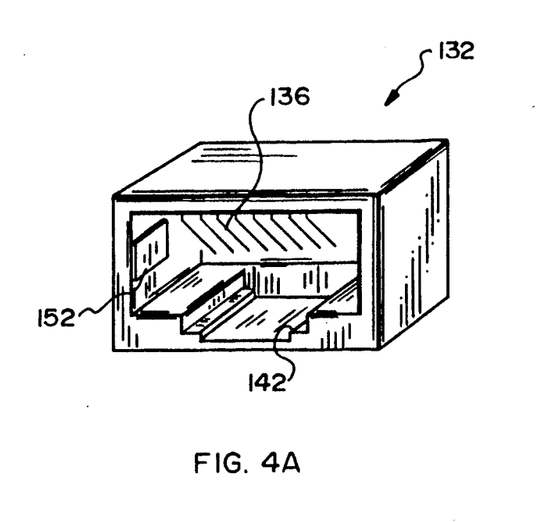
FIGS. 4A and 4B are perspective views of the female and male electrical connectors, respectively, shown in FIG. 3.
Figure 4B:
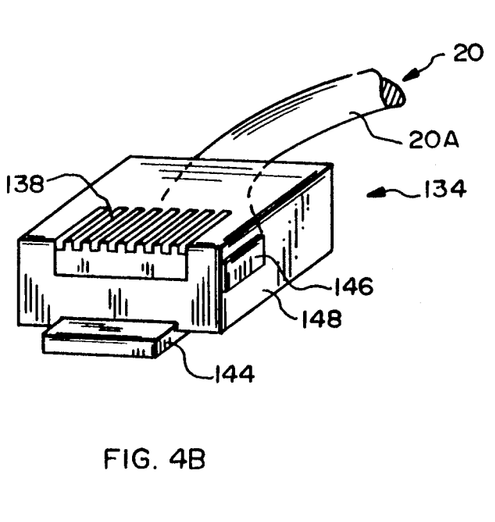

The female connector 132 of FIG. 4A has an inner space for receiving the male connector or plug 134 of FIG. 4B. The connector 132 has top-mounted contacts 136 which electrically contact topmounted contacts 138 on the male connector 134, and bottom-located detent features 142 which physically engage a latch 144 on the male connector 134.

The male connector 134 has an outer contact area 146 which can be formed as a discrete contact as shown or as a conductive plating on the outer surface 148 of the connector 134. The contact area 146 is electrically connected to the shield 20A. The contact area 134 makes physical and electrical contact with a similar area 152 furnished on an inner wall of the female connector 132.

Since the female connector 132 electrically contacts the bulkhead 120, this arrangement electrically interconnects the shield 20A with the bulkhead 120.

With reference again to FIG. 3, the NIC pc board 22A carries and electrically interconnects various components, including those described in FIG. 2. The NIC pc board 22A is preferably a multi-layer board, as is shown in FIG. 5.

In FIG. 5, the NIC pc board 22A is depicted as having four layers; i.e., a top layer 152 on which active devices, such as the transceiver 26 (not shown in FIG. 5) and the output transformer 90 are mounted; a ground plane 154 disposed underneath the top layer 152; a power plane 156 disposed underneath the ground plane 154; and a bottom layer 158 disposed underneath the power plane 156. Normally, inactive devices 159 are mounted on the bottom layer 158. Conductors 162 are furnished on the layers 152–158, and, due to the process by which they are typically made, are called "etch lines" or "etch regions." A plurality of conductive vias 160 extend through the board 22A to make selective contact between conductors 162 on two or more layers.

In accordance with still a further aspect of the invention which is illustrated in FIGS. 6A-6D, voids 170, i.e., areas lacking conductors 162, are provided in the ground plane 154 and power plane 156 immediately underneath the output transformer 90. The voids 170 occupy surface areas of those layers that are at least half as large as the "footprint" of the transformer 90, i.e., the profile of the transformer 90 when viewed orthogonally from above the board 22A.

Figure 6A:
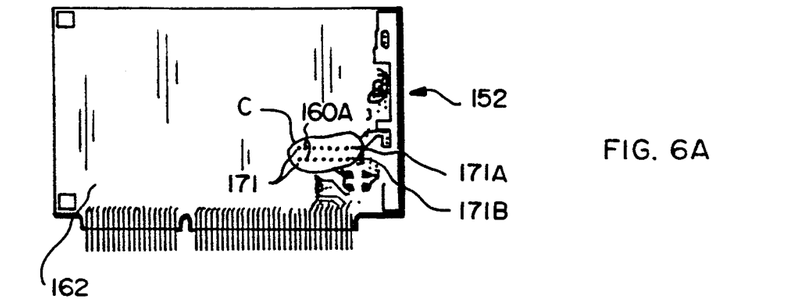
FIGS. 6A, 6B, 6C and 6D are top plan views of the layers of the printed circuit ("pc") board of the computer network interface of FIG. 3.
Figure 6B:
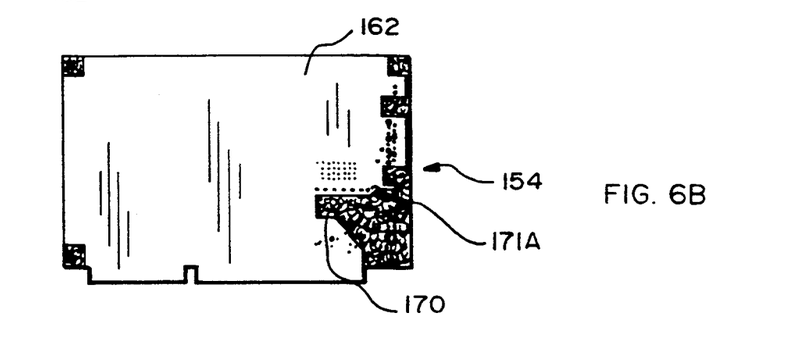
Figure 6C:
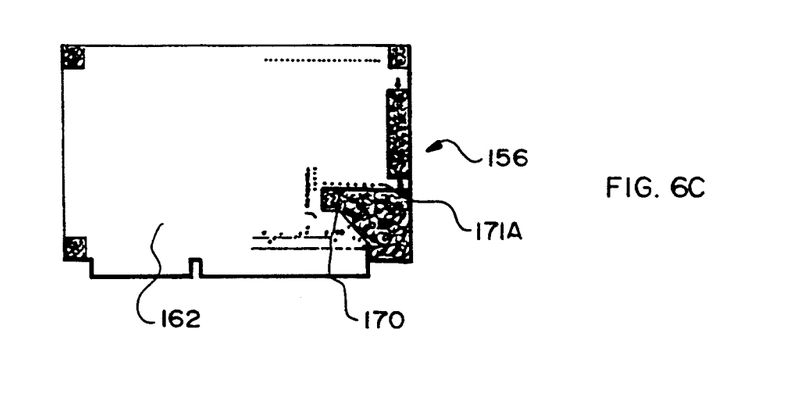
Figure 6D:
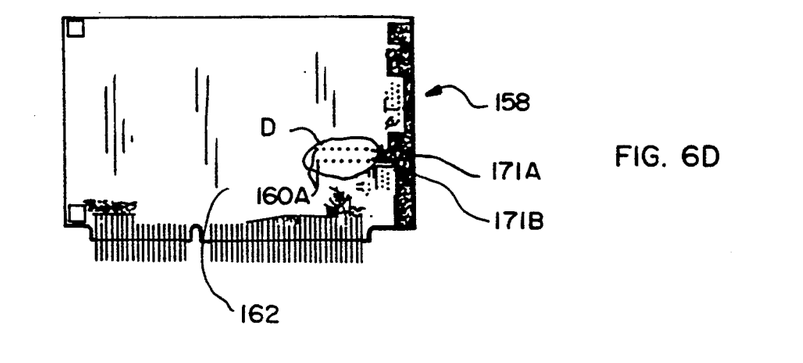

More specifically, FIG. 6A shows two parallel rows 171 of vias or holes 160A (within circled area "C") for receiving leads 172 (see FIG. 5) of the output transformer 90. The area between the holes 160A is substantially equivalent to the footprint of the transformer 90. The holes 160A of rows 171 extend through the board 22A, as can be seen in the circled area "D" of FIG. 6D. The ground and power planes 154, 156 have voids 170 that subsume the bottom row 171B of holes 160A and nearly reach the top row 171A of holes 160A.

By keeping the ground plane and power plane conductors 162 away from the transformer 90, electromagnetic coupling of signals from the transformer that could result in voltage transients in the ground and power planes 154, 156, i.e., electromagnetic interference is reduced. Accordingly, the voids prevent cross-coupling of signal lines with the ground and power planes. Also, it is desirable to keep the logic ground from overlapping with the bulkhead ground to prevent current cross-coupling therebetween.

The foregoing description has been limited to a specific illustrative embodiment of this invention. It will be apparent, however, that variations and modifications may be made to the depicted embodiment with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A network interface card that exhibits reduced electromagnetic interference and reduced radio-frequency emissions, the network interface card including means for translating signals for communication; a transceiver coupled to said translating means, and having a driver and a logic ground; and a filter coupled to said driver comprising an output transformer having an input winding and an output winding with a center tap that is capacitively coupled both to a reference ground and to said logic ground of said transceiver.

2. The network interface card in accordance with claim 1, wherein said filter applies signals to a communication link comprising a shielded twisted-pair cable.

3. The network interface card in accordance with claim 1, wherein said transceiver is coupled to said filter by first and second signal lines, and each of said signal lines is capacitively coupled to both said reference ground and said logic ground of said transceiver.

4. The network interface card in accordance with claim 3, wherein said network interface card includes a circuit node to which said center tap and each of said signal lines are capacitively coupled.

5. The network interface card in accordance with claim 4, wherein said reference ground is capacitively coupled to said circuit node.

6. The network interface card in accordance with claim 5, further comprising a serial interface coupled with said transceiver by at least third and fourth signal lines, which are each capacitively coupled to said reference ground and said logic ground of said transceiver.

7. The network interface card in accordance with claim 1, further comprising a serial interface coupled with said transceiver by at least third and fourth signal lines, which are each capacitively coupled to said reference ground and said logic ground of said transceiver.

8. The network interface card in accordance with claim 1, further comprising a multi-layer printed circuit board including a top layer, a ground plane underneath said top layer, a power plane underneath said ground plane, and a bottom layer underneath said power ground, each said top and bottom layers and said ground and power planes having a conductor on a side thereof, and wherein said output transformer is mounted over a section of said top layer corresponding to a section of said ground plane that does not include said ground plane conductor.

9. The network interface card in accordance with claim 1, further comprising a multi-layer printed circuit board including a top layer, a ground plane underneath said top layer, a power plane underneath said ground plane, and a bottom layer underneath said power ground, each said top and bottom layers and said ground and power planes having a conductor on a side thereof, and wherein said output transformer is mounted over a section of said top layer corresponding to a section of said ground plane that does not include said ground plane conductor.

10. For reducing electromagnetic emission from a network interface card having
  a) a transceiver including a logic ground, and
  b) a filter coupled to said transceiver and including an output transformer having an input winding and an output winding having a center tap,
a circuit comprising:
  i) first means coupled to said center tap for passing a first signal therefrom above a first selected frequency to a node connected to said logic ground, and
  ii) second means coupled to said node for passing a second signal therefrom above a second selected frequency to a reference ground.

11. The circuit according to claim 10, wherein said first means includes a first capacitor connected between said center tap and said node, and said second means includes a second capacitor connected between said node and said reference ground.

12. The circuit according to claim 10, wherein said first and second selected frequencies are approximately equal, and wherein said first signal from said center tap include said second signal and a third signal, and said circuit further includes third means for passing said third signal to said logic ground, the amplitude of said third signal being greater than the amplitude of said second signal being passed to said reference ground.

13. A method of reducing radio emissions caused by a network interface card having translating means for translating signals for communication; a transceiver coupled to said translating means, and having a driver and a logic ground; and a filter coupled to said driver comprising an output transformer having an input winding and an output winding having a center tap, said method comprising the steps of capacitively coupling said center tap of said output winding to a reference ground, and capacitively coupled said center tap of said output winding to said logic ground of said transceiver.

14. The method of reducing radio emissions in accordance with claim 13, wherein said transceiver is coupled to said filter by first and second signal lines, and said method further comprises the step of capacitively coupling each of said signal lines to both said reference ground and said logic ground of said transceiver.

15. The method of reducing radio emissions in accordance with claim 13, wherein said network interface card includes a circuit node and said transceiver is coupled to said filter by first and second signal lines, and said method further comprises the step of capacitively coupling said circuit node to said center tap and each of said signal lines.

* * * * *